July 5, 1932.  P. SCHOONENBERG  1,865,967
MACHINE FOR MANUFACTURING HOLLOW GLASS BODIES
Filed Sept. 29, 1925   6 Sheets-Sheet 1

Inventor.
Pancras Schoonenberg
By E. T. & J. F. Brandenburg Attorneys

July 5, 1932. P. SCHOONENBERG 1,865,967
MACHINE FOR MANUFACTURING HOLLOW GLASS BODIES
Filed Sept. 29, 1925 6 Sheets-Sheet 2

Inventor.
Pancras Schoonenberg
By E.T. & J.F. Brandenburg atty

July 5, 1932. P. SCHOONENBERG 1,865,967

MACHINE FOR MANUFACTURING HOLLOW GLASS BODIES

Filed Sept. 29, 1925 6 Sheets-Sheet 3

Inventor.
Pancras Schoonenberg
By E. F. & J. F. Brandenburg Attorneys

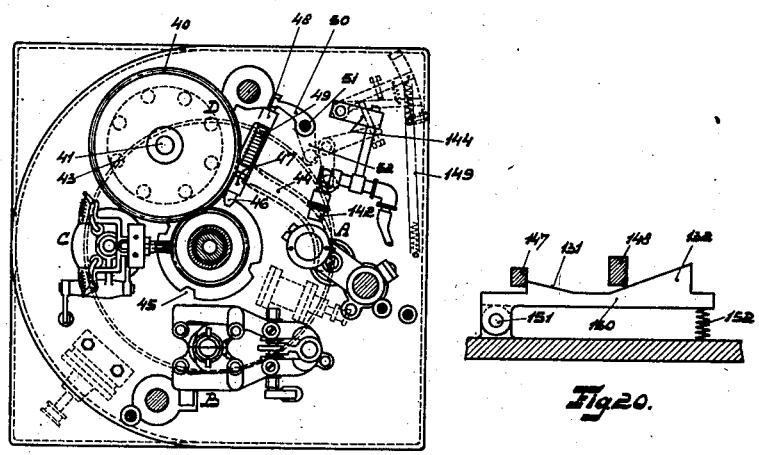
July 5, 1932. P. SCHOONENBERG 1,865,967
MACHINE FOR MANUFACTURING HOLLOW GLASS BODIES
Filed Sept. 29, 1925 6 Sheets-Sheet 4

July 5, 1932.    P. SCHOONENBERG    1,865,967
MACHINE FOR MANUFACTURING HOLLOW GLASS BODIES
Filed Sept. 29, 1925    6 Sheets-Sheet 5

Inventor:
Pancras Schoonenberg
By: E.T. & J.F. Brandenburg, attorneys

July 5, 1932. P. SCHOONENBERG 1,865,967
MACHINE FOR MANUFACTURING HOLLOW GLASS BODIES
Filed Sept. 29, 1925 6 Sheets-Sheet 6
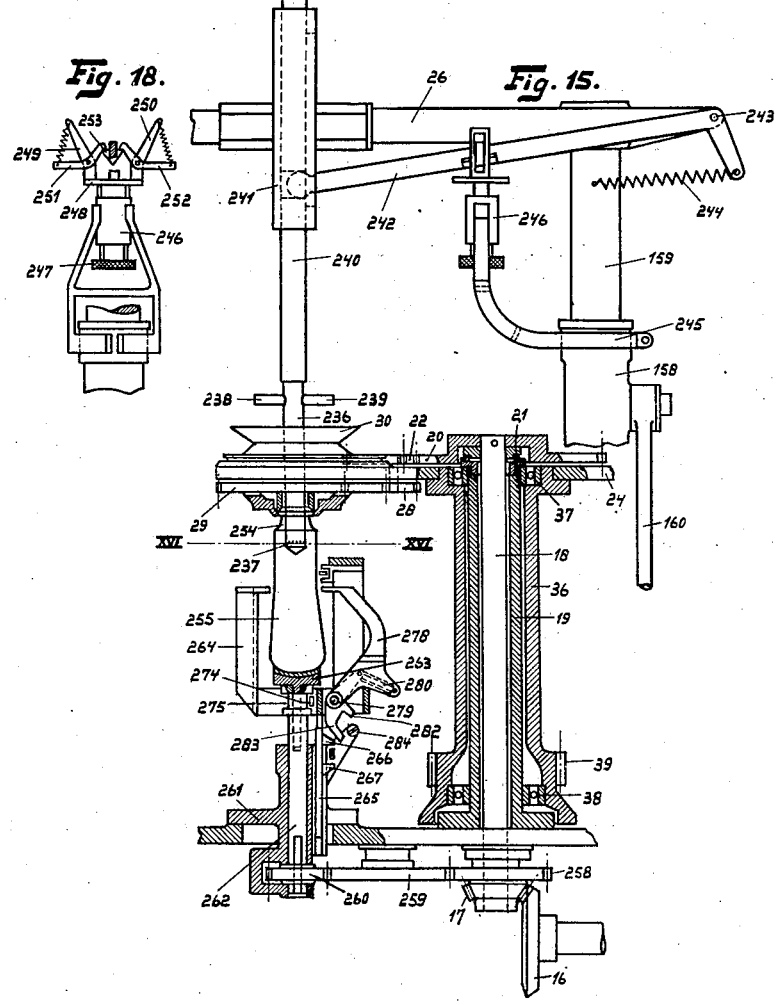
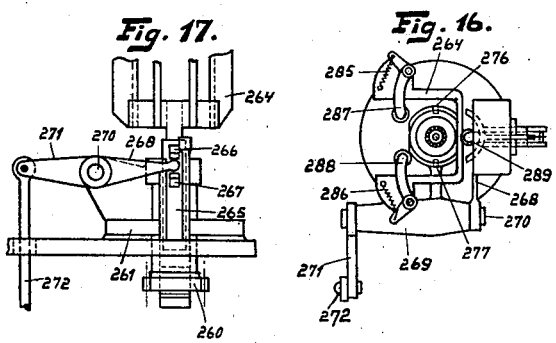
Inventor
Pancras Schoonenberg
By E. S. & J. F. Brandenburg attorneys Patented July 5, 1932

1,865,967

UNITED STATES PATENT OFFICE

PANCRAS SCHOONENBERG, OF EINDHOVEN, NETHERLANDS, ASSIGNOR TO NAAMLOOZE VENNOOTSCHAP INTERNATIONAAL OCTROOIBUREAU, OF EINDHOVEN, NETHERLANDS

MACHINE FOR MANUFACTURING HOLLOW GLASS BODIES

Application filed September 29, 1925, Serial No. 59,381, and in the Netherlands October 8, 1924.

This invention is concerned with machines for manufacturing hollow glass bodies and relates more particularly to those glass operating machines in which the hollow glass bodies are manufactured from portions of glass and in which the portions of glass are first pressed and then blown.

Machines of this kind are already known in which a separate vertically movable pressing stamp for pressing the portion of glass and in addition a vertically movable blowing head for blowing the preliminarily moulded glass body are provided. In these machines the glass body is transferred from the pressing position to the blowing position by carriers which are arranged on a rotary table and serve also as blowing moulds, the glass bodies being withdrawn from the machine by opening the said carriers. It has also been already suggested to transfer the glass body by hand from the pressing to the blowing position with the aid of a so-called neck mold. In this case the glass bodies are withdrawn from the machine with the aid of the said neck molds.

The machine according to the invention comprises a pressing stamp and a pressing mould cooperating therewith, a blowing head and a final blowing mould cooperating therewith, a number of neck molds operative to bring the glass bodies to be operated simultaneously into operative relation to the said members, means operative to move the neck molds and the members for pressing and blowing the glass bodies relatively to each other and means operative to remove the finished glass bodies from the neck molds.

The machine according to the invention is adapted to blow thin-walled glass bodies such as lamp bulbs and to operate wholly automatically.

The machine according to the invention comprises preferably devices operative to segregate the blown body from the lost head and to remove the lost head. The machine is so arranged that the glass bodies to be operated are brought simultaneously into operative relation to the said devices and to the members for pressing and blowing.

The term "lost head" is to be understood to mean the annular glass portion that remains in the neck mold after the withdrawal of the glass product to be manufactured.

In some operations it is desirable that the glass body should rotate relatively to the members serving for these operations. It is, for example, desirable to make the glass body and the final blowing mould rotate relatively to each other during the final blowing operation. This may be ensured by so arranging the neck molds as to rotate on their own axis.

The machine according to the invention may comprise an intermittently rotatable frame to which the neck molds are secured. The neck molds may be arranged in a table which is secured to a hollow bush adapted to rotate intermittently around a central column, a cam track adapted to rotate uninterruptedly around the shaft of the central column serving to actuate the members for pressing and blowing and if necessary the devices operative to segregate the blown body from the lost head and to remove it therefrom.

When in the machine according to the invention the neck molds are adapted to rotate, means are preferably provided in addition to lock the normally rotating neck molds as in some operations, for example, in the pressing operation the glass body should be stationary relatively to the members serving for these operations. For this purpose the neck molds may be connected to gear wheels driven by friction from one or various uninterruptedly rotating members, pawls being provided which in determined positions of the intermittently rotatable frame which carries the neck molds are moved into or out of engagement with the teeth of the said gear wheels.

In order that the portion of glass when being fed to the pressing mould be guided, the neck mold may comprise a funnel-shaped portion.

In addition each neck mold may comprise a stationary portion and two rotatable jaws fixed thereto, the edges of which form together with the lower edge of the stationary portion an interstice in which the glass body to be operated can be suspended and which jaws are resiliently kept closed. The vertically movable pressing mold may be so shaped that in its uppermost position it bears on the rotatable jaws and thus prevents the latter from opening.

It is desirable that the pressed glass body before it is blown out in the final blowing mould into the final shape should first be slightly blown out. The hollow glass body thus produced will be referred to as the "glass recipient". The machine according to the invention may for this preliminary blowing-out comprise adjacent the position for pressing the glass body blowing devices which are preferably adapted to feed the compressed air by blasts to the pressed glass body.

As the glass body is materially chilled by the pressing operation and the subsequent blowing-out operation, there may be adjacent the pressing position of the machine devices operative to heat the glass recipient. Preferably this heating operation is controlled and may be effected by a gas burner. In order to ensure uniform heating of the glass body a device may be provided to make the gas burner suddenly snap away at the end of the heating operation.

The glass body when being blown out into a glass recipient and during the subsequent heating operation is preferably rotated. It is however desirable that the neck molds during their transfer from the pressing position to the final blowing position should be locked as otherwise the glass body hanging down would be deformed by oscillation.

For pressing and subsequently blowing the glass body a vertically movable press and blow aggregate may be arranged adjacent the pressing position, said aggregrate comprising a rotary portion serving for the hermetic seal along the upper edge of the glass recipient and means operative to cause the said portion to be carried along with the rotating neck mold. The rotary portion may be provided with fingers which in the operative position press resiliently against the upper edge of the funnel-shaped portion of the neck mold.

For the hermetic seal along the upper end of the glass recipient the rotary portion of the press and blow aggregate may comprise a bush fitting in a cylindrical bore of the neck mold, the lower end of said bush pressing on the glass and having preferably a convex shape.

The pressing stamp itself need not be adapted to rotate within the rotary portion of the press and blow aggregate and it can be arranged therein in such a manner that it is possible for the rotary portion to vertically slide along the pressing stamp, which movement is resiliently controlled.

In order that the portion of glass may be prevented from chilling excessively the pressing stamp may be slightly raised after the pressing operation, the rotary portion of the press and blow aggregate remaining however in engagement with the portion of glass.

The vertically movable blowing head may be provided with means operative to center the blowing head automatically in relation to the neck mold. The blowing head may be provided with a sealing-member which in the final blowing position bears hermetically on the final-shaped inner wall of the neck mold and is provided with a canal for the passage of the compressed air. This sealing-member may be secured to the carrier of the blowing head by means of a ball bearing or similar member so as to be automatically centered.

The blowing head may also comprise a portion adapted to rotate with the neck mold and a stationary portion, said two portions being resiliently united.

Preferably means are in addition provided to center the final blowing mould relatively to the neck mold. The final blowing mould may consist of two halves adapted to rotate on a vertical shaft, horizontal guides being provided on which the halves are supported when being opened and closed. In addition the blowing mould halves may be opened and closed by a shaft adapted to rotate back and forth and provided with a left hand and a right hand thread, means being provided to prevent the said shaft from moving lengthwise.

Some other features of the invention will be more clearly understood by referring to the following specification and the drawings.

The accompanying drawings illustrate a construction of a bulb blowing machine according to the invention which operates uninterruptedly and in which an intermittently moved rotary carrier has four different positions for preliminary moulding, finally blowing and sealing-off the bulbs and for removing the lost head. In the said drawings:

Figure 4 is a section taken on the line IV—IV in Figure 1 and shows at the same time a plan of the members arranged below the plane of the section.

Figure 5 is a detail view on a larger scale of the pressing stamp, the neck mold and the pressing mould, these three members being shewn in the pressing position relatively to each other.

In Figure 15 are shewn the burner for sealing-off the glass body with its operating mechanism and the ejector for removing the sealed-off bulb. It is to be noted that for the sake of clearness the operating mechanism of the burner with the central column of the machine is shewn in this figure in the plane of drawings. In reality however, this operating mechanism is turned through an angle relatively to the plane passing through the central column and the neck mold.

Figures 16, 17 and 18 are detail views of various members of the device shewn in Figure 15.

Figures 19 and 20 are detail views of the movable burner for heating the portion of glass blown out in position A.

Before entering into the detailed description of the machine illustrated the general operation of the machine will be described.

Figure 1:
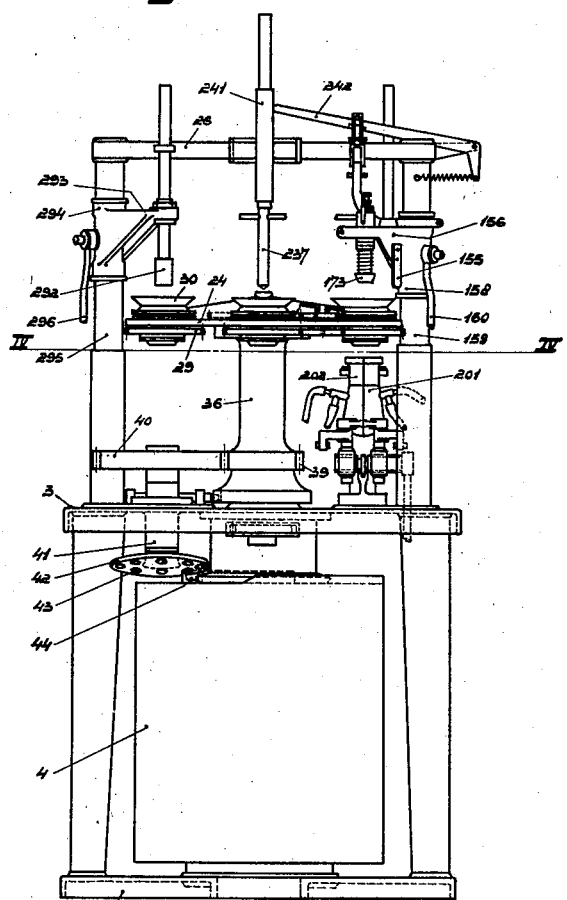
Figure 1 is a front elevation of the machine, in which various members have been omitted for the sake of simplicity and others are only shewn diagrammatically.

The machine comprises a central rotary column 36 to which a table 24 is rigidly secured (Figure 1). In the said table are rotatably arranged four neck molds on which as hereinafter described, the bulb to be operated is suspended. The column 36 is intermittently moved so that the neck molds occupy successively the positions A, B, C and D as shewn in Figures 3 and 4.

In position A the portion of glass is fed and is pressed into a pressing-mould 57 (Figures 2 and 5) by means of a plunger 112, the glass body being simultaneously suspended in one of the neck molds which do not rotate during the said operation. After the pressing mould has descended blasts of air are sent into the glass body by the pressing aggregate. This operation will hereinafter be referred to as "puffing".

After the plunger has risen the glass body which is partially blown out and is by this time rotated together with the neck mold is heated up again from without and then the column 36 is rotated to the next position so that the neck mold with the glass body arrive in the final blowing position. During the transfer from position A to B the glass body sags. In position B it is blown out in a finishing mould consisting of two halves 201 and 202 (Figure 1), during which operation the glass body is rotated.

By reason of the column 36 moving again to the position next in order the neck mold arrives with the blown bulb in the position C, where the bulb 255 is sealed-off the lost head 254 (Figure 15) by a centrally arranged burner 237 (Figure 1). During the sealing-off operation the bulb is rotated and supported by a similarly rotating supporting device. After the sealing-off operation the bulb is removed by an ejecting device laterally from the supporting device.

By reason of the rotation of the column 36 the neck mold with the lost head suspended on it is then transferred into the position D, where the lost head is removed from the neck mold by a vertically moving expelling stud 292 (Figure 1), whereupon the emptied neck mold is transferred to position A and the same series of operations is repeated with the same neck mold.

It is of course, obvious that the different operations at the four positions of the machine are carried out simultaneously.

A more detailed description of the various members of the machine will now be given.

Figure 2:
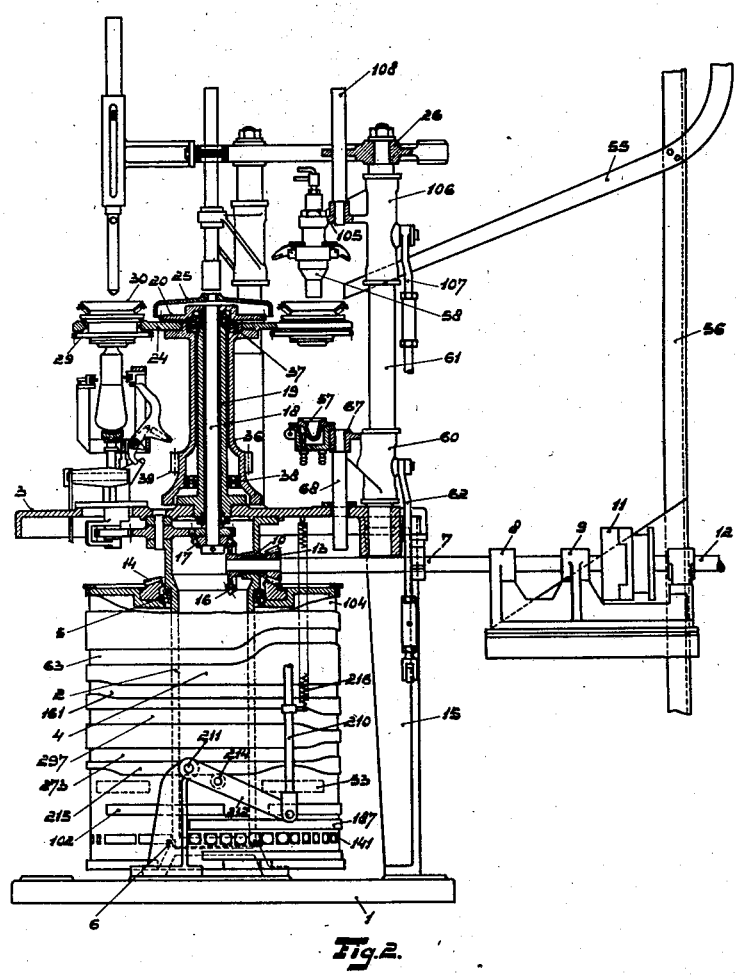
Figure 2 is a side view with part of the machine in vertical section.

On a base-plate 1 is mounted a column 2 to the upper end of which is secured a bed-plate 3 (Figure 2). A cam drum 4 is adapted to rotate around the column 2 on ball-bearings 5 and 6. The said drum is actuated from a horizontal shaft 7 adapted to rotate in bearings 8, 9 and 10. The shaft 7 is united to a shaft 12 by a claw-clutch 11, the shaft 12 being driven in any suitable manner, for example, by an electro-motor. On the shaft 7 is seated a bevel gear 13 meshing with a bevel gear 14 secured to the drum 4 (Figure 2).

Figure 6:
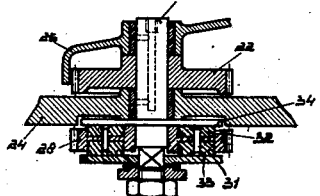
Figure 6 is a detail view of a device for rotating the neck mold, the device for locking same being shewn in Figure 7.
Figure 3:
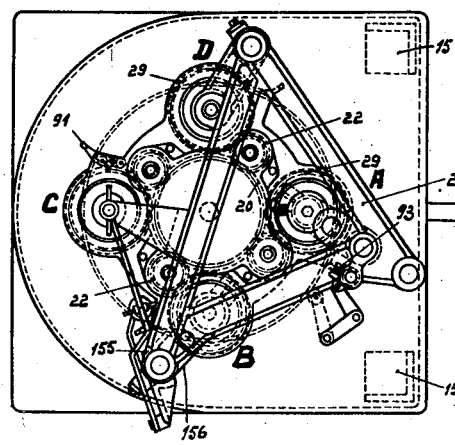
Figure 3 is a plan of the machine.

The horizontal shaft 7 drives by means of engaging bevel gears 16 and 17 also a central vertical shaft 18 which is adapted to rotate in a column 19 mounted on the bed-plate 3 (Figures 2 and 15). At the upper end of the shaft 18 is secured a gear wheel 20 adapted to rotate on the upper end of the column 19 with an interposed ball bearing 21. The gear wheel 20 meshes with four gear wheels 22 (Figure 3) secured to vertical spindles 23 (Figure 6) which are adapted to rotate in a table 24 and a covering plate 25. Below the table 24 the spindles 23 have arranged on them gear wheels 28 meshing with gear wheels 29 which are rigidly united to neck molds 30 (Figures 3 and 15). The gear wheels 28 are normally carried along with the spindles 23 by reason of the friction between plates 33 and 34 rigidly seated on the spindles 23 and discs 31 and 32 (Figure 6). The vertical shaft 18 being continuously driven by the shaft 7, the neck molds are normally rotated unless they are temporarily locked by a locking device hereinafter described.

The table 24 in which the neck molds 30 are arranged is rotated intermittently. For this purpose the column 19 has arranged around it a column 36 adapted to rotate on ball bearings 37 and 38 (Figures 2 and 15). In this column is cut a gear 39 which engages the teeth of a wheel 40 (Figure 1) seated on a vertical shaft 41. This shaft carries at its lower end a disc 42 to which are secured a number of rollers 43. On the upper surface of the drum 4 is provided a track 44 (Figures 1 and 4). When the drum rotates a roller 43 is periodically caused to bear between the side walls of the said track and by reason of the peculiar shape of the track the disc 42 and with it the shaft 41, is periodically rotated through the desired angle. By reason of the transmission of the gear wheel 40 on the gear 39 the table 24 which is rigidly attached to the column 36 is also rotated intermittently.

In order that the table may be locked in the four positions the lower end of the column 36 is provided with recesses 45 in which a pawl 46 can enter (Figure 4). The said pawl 46 is adapted to slide in small housings 47 and 48 and is kept in engagement by a helical spring 49. In order that the pawl may be moved back at the proper moment against the action of the spring so that the column 36 is free to rotate, a lever 50 is provided the end of which enters a recess of the pawl 46. The lever 50 is secured to a vertical shaft 51 which is turned by reason of the end of a lever 52 engaging a cam track provided on the drum 4 (Figure 4).

In position A of the machine the portion of glass is fed to the machine by means of any suitable glass feeding device. From the glass feeding device the portion of glass falls on to a chute 55 (Figure 2) secured to the frame 56 of the glass feeding device.

In position A of the machine the portion of glass is pressed, preliminarily blown and then heated up again. In order that these operations may be carried out, a vertically movable pressing mould 57, a vertically movable press and blow aggregate 58 (Figure 2) and a movable burner 142 (Figure 4) are provided.

The pressing mould 57 is adjustably secured to a sleeve 60 adapted to slide along a vertical column 61 mounted on the bed-plate 3 (Figure 2). The sleeve is moved by means of a rod 62 united to a lever (not shown) the other end of which is provided with a roller engaging a groove 63 of the drum 4.

The pressing mould 57 has arranged around it a cooling jacket 64 (Figure 5) provided with supply and discharge conduits 65 and 66. The cooling jacket 64 is secured to a horizontal lever 67 (Figure 2) which projects from the sleeve 60 and has secured to it a vertical rod 68 guided in the bed-plate 3.

The neck mold 30 which is adapted to rotate on ball-bearings 71 and 72 (Figure 5) in the table 24 is normally rotated in the manner previously described by a gear wheel 29. The neck mold has a cylindrical portion 73 and a funnel-shaped portion 74. The latter portion serves to retain and guide the portion of glass falling down from the chute 55 (Figure 2). On the lower side of the neck mold there are two bulb holders or jaws, 77 and 78 adapted to turn on studs 75 and 76. The said bulb holders are provided with semicircular edges 79 and 80 fitting the lower end of the cylindrical portion 73 of the neck mold and forming therewith in the closed position an annular interstice 81. The two bulb holders are kept closed by draw-springs 82 and 83. When the neck mold has arrived in position A it is first locked and then the pressing mould 57 rises, the oblique brim 85 of the pressing mould fitting the lower edge of the rotatable bulb holders 77 and 78, which prevents them at the same time from opening against the action of the springs 82 and 83 because of the pressure occurring during the pressing operation.

Figure 7:
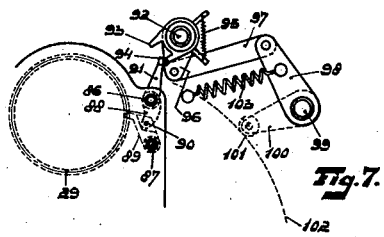

The locking device for the neck molds is shewn in Figure 7. In the table 24 are arranged studs 86 and 87 on which a lever 88 and a pawl 89 are pivoted. The pawl engages the teeth of the corresponding gear wheel 29 and is united to one end of the lever 88 by a pivot 90. A ledge 91 is normally in such a position that the gear wheel 29 is free to rotate. Now a mechanism is arranged near the position A to shift the ledge 91. On a shaft 92 adapted to rotate in the bed plate 3 and in the frame 26 are arranged two ledges 93 and 94. The ledge 94 is rigidly secured to the shaft whereas the ledge 93 is adapted to turn on the shaft but is connected by a draw-spring 95 to the ledge 94. The shaft 92 has in addition secured to it a lever 96 connected by a rod 97 to a lever 98 which is secured to a vertical shaft 99 adapted to rotate in the bed-plate 3 and in the baseplate 1. The shaft 99 carries a lever 100 the end of which is provided with a roller 101 (Figure 7) which engages the cam track 102 arranged on the drum 4 (Figure 2). The roller is kept in engagement with the track by a drawspring 103. Now, when the neck mold has reached the position A, the shaft 99, and therefore similarly the shaft 92, is rotated because of the shape of the cam track 102, the shaft 92 being rotated in an anti-clockwise direction. The ledge 93 which is carried along with the spring 95 engages the ledge 91, which ensures that the pawl 89 engages the gear wheel 29. The resilient transmission between the shaft 92 and the ledge 93 prevents any damage to the members. Now the gear wheel 29 is locked so that the gear wheel 28 rubs along the plates 33 and 34.

After the pressing mold has risen the portion of the glass is fed and the press and blow aggregate 58 descends.

The press and blow aggregate is suspended on a horizontal arm 105 which projects from a sleeve 106 adapted to slide on the column 61 (Figure 2). The vertical movement, and similarly the movement of the pressing mould, is resiliently transmitted by a rod 107 the lower end of which is secured to a lever (not shewn) the other end of which engages a groove 104 on the drum 4. From the horizontal arm 105 a rod 108 extends upwards, which rod is guided in the frame 26.

The press and blow aggregate comprises a bushing 109 (Figure 5) bearing by a shoulder 110 on the arm 105 to which it is rigidly connected by a locking ring 111. A pressing stamp or plunger 112 is secured in the said bushing by reason of a shoulder 113 bearing on the lower end of the bushing whilst a locking ring 114 presses against the upper end of the bushing 109. The plunger which is heated in contact with the hot glass comprises a cooling chamber 115 through which any cooling liquid can circulate. Between the wall of the plunger 112 and the inner wall of the bushing 109 there are a number of grooves 116 which open at 117 and serve to admit blowing air. The upper side of the bushing 109 is provided with an annular groove 118 registering with a compressed air supply conduit 119. The bushing 109 has rotatably arranged around it a second bushing 120. A helical spring 124 forces the bushing 120 downwards, the pressure between the helix 124 and the bushing 109 being transmitted by a ball-bearing 125. A ring 126 screwed on the bushing 120 has two arms 127 projecting from it, said arms having rotatably secured to its ledges 128 forced downwards by springs 129. The bushing 120 is normally supported by the rim 121 of the ring 126 upon the projections 122 of the cylinder 123 secured to the bushing 109.

When in position A the portion of glass has been fed to the pressing mould, the press and blow aggregate descends. In this movement the fingers 128 first engage the edge of the funnel-shaped portion 74 of the neck mould. When the arm 105 continues its downward movement the spring 124 is compressed and the bushing 120 slides upwards along the bushing 109 so that the plunger 112 emerges from the lower opening of the bushing 120. The arm 105 descends until the plunger has entered the portion of glass and the lower edge of the bushing 120 contacts with the liquid glass. The press and blow aggregate is centered relatively to the neck mold because of the bushing 120 fitting in the cylindrical part 73 of the neck mold. This position is shewn in Figure 5. The glass is pressed into the annular interstices 81 of the neck mold which permits of the glass body being carried along with the neck mold. As the size of the portion of glass is not always exactly the same the lower edge of the bushing 120 cannot always occupy exactly the same raised position. This is provided for by the resilient transmission between the bushing 120 and the bushing 109.

After the portion of glass is pressed the pressing mould descends and the portion is slightly blown out. Meanwhile the neck mold is rotated. At the same time the plunger rises slightly in order to prevent excessive chilling of the portion. The bushing 120 keeps however bearing on the glass. The fingers 128 assist to give the press and blow aggregate a stationary position relatively to the portion of glass.

In order that the gear wheel 29 locked until now may be released, the roller 101 (Figure 7) is so moved by the cam track 102 that the shaft 92 rotates in a clockwise direction. The ledge 94 consequently engages the ledge 91 so that the pawl 89 is withdrawn from the teeth of the wheel 29. The neck mold which now rotates carries the portion of glass along with it, which movement the bushing 120 follows by reason of the friction between the glass and the lower edge of the bushing and between the ledges 128 and the upper edge of the neck mold.

Figures 8, 11:
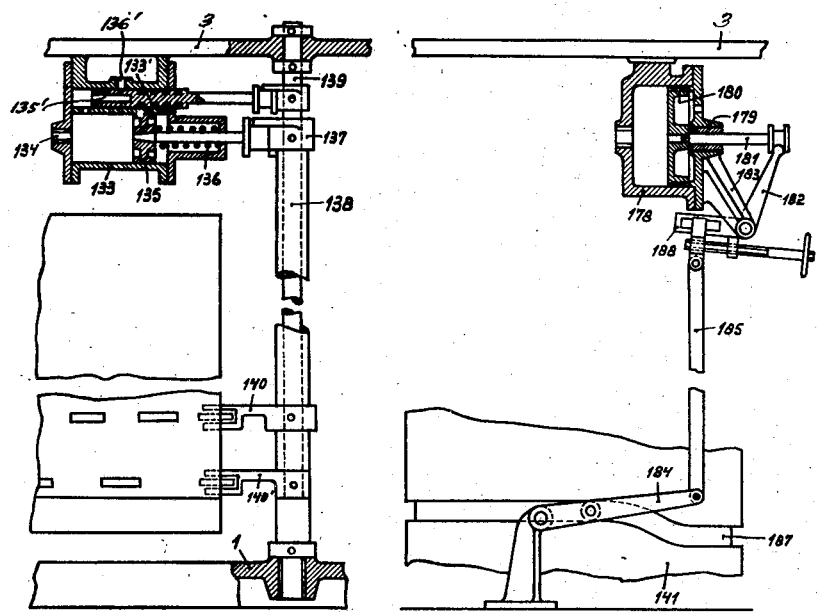
Figure 8 shows a device for admitting a number of air blasts to the pressed glass body whilst the latter occupies the pressing position.
Figure 11 shows a device for admitting compressed air to the blowing head.
Figure 9:
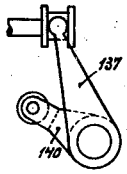
Figure 9 is a detail view of this device.

The compressed air may be fed to the portion of glass by blasts of air, for which purpose the device shewn in Figures 8 and 9 is provided.

The lower side of the bedplate 24 has secured to it an air-cylinder 133. The bottom of the cylinder has a port 134 to which is connected a conduit to the press and blow aggregate. The small piston 135 influenced by a helical spring 136 is reciprocated by a lever 137 (Figure 9) the end of which is embraced by the collars of a small bushing which is secured to the piston rod. The lever 137 is secured to a vertical shaft 138 adapted to rotate around the shaft 139 and carrying a lever 140 the end of which is provided with a roller running along a cam track 141 (Figure 2) on the drum 4.

For the control of the air-supply to the cylinder 133 is provided a control-slide 133' which is moved from the shaft 139 similarly to the piston 135 by the hollow shaft 138. The control slide 133' is provided with an opening 135' which moves along the air supply port 136'. The movement of the levers 140 and the lever 140' which is rigidly seated on the shaft 139 is such that the control-slide 133' shuts off the air-supply before the piston begins to press and opens the supply before the piston recedes.

The air fed by blasts blows the portion of glass slightly out, a good hermetic seal along the bushing 120 being ensured by reason of a locking ring 130 (Figure 5) arranged on the lower end of the bushing 120.

After the air-blast blowing operation, so called puffing, the press and blow aggregate rises again and the still rotating portion of glass is heated up again by a burner 142 (Figures 4 and 19).

The burner 142 provided with a gas supply 143 is secured to a block 144 and is after heating the glass portion suddenly swung away in order to prevent uneven heating of the glass.

For this purpose the block 144 is secured to a shaft 145 adapted to rotate in the bed-plate 3 and the base-plate 1 and having rigidly secured to it a lever 147, a lever 146 which is united to the lever 147 by a draw-spring 148 being pivoted on the shaft 145.

In Figures 4 and 19 the burner 142 is shewn in the heating position. The burner is kept in this position by a draw-spring 149 which draws the lever 146 against an adjusting screw 154 secured to a bell-crank 153 whilst an adjusting screw 146' carries the lever 147 along with it. The limit of travel of the adjusting screw 154 is determined by reason of a roller seated on the lever 153 engaging a cam track 153' on the drum 4. When this roller is forced to the right by the track 153' (Figure 19) the lever 146 is turned against the action of the spring 149. The lever 147 cannot follow this movement as it is caught behind a nose 131 (Figure 20) on a track 150 which is pivoted on a stud 151, and has its end bearing on a spring 152. The spring 148 is then stretched. When the lever 146 turns, it engages the incline 132 and forces the track 150 down until the lever 147 can snap away over the nose 131 and carries the burner along with it. By reason of the shape of the cam track 153' and the spring 149 the burner is progressively brought back again to the operative position.

After being heated up again the portion of glass is transferred to the next position B, in which movement the glass body sags to a greater extent and in order to prevent oscillation the neck mold is again set stationary during this transfer. For this purpose the shaft 92 (Figure 7) is again rotated in an anti-clockwise direction so that the ledge 93 forces against the ledge 91 and the pawl 89 again engages the teeth of the gear wheel 29. Thereupon the shaft 92 is again rotated back so that the ledge 91 of a following neck mold after passing the ledge 93 can be brought into the locking position.

On reaching position B the gear wheel 29 is again released because of the ledge 91 engaging a spring 155 secured to a housing 156 (Figures 1 and 3).

Figure 10:
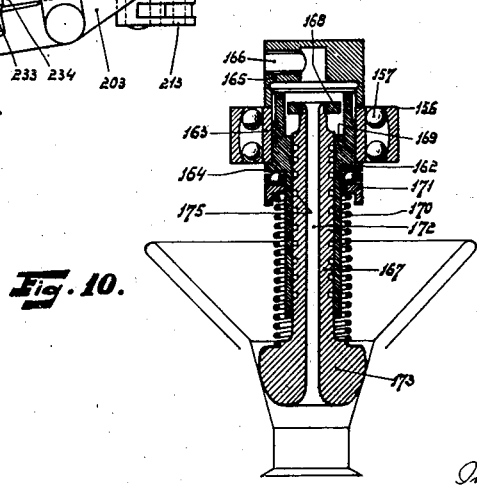
Figure 10 shows the blowing head.

In position B the portion of glass has to be blown to the final shape in a blowing mould. A final blowing aggregate which is shewn in detail in Figure 10 serves for this purpose.

The blowing aggregate is adapted to rotate on ball bearings 157 in the housing 156 which is integral with a sleeve 158 vertically moving on the column 159 (Figure 1). This column is mounted on the bed-plate 3 and is secured at the top to the frame 26. The vertical movement of the sleeve 158 is effected by a rod 160 which is united to one end of a lever (not shewn) pivoted on a fixed point and having its other end running in a groove 161 (Figure 2) of the drum 4. The blowing aggregate comprises a bushing 162 rigidly secured to a ring 163 between a shoulder 164 and a cover 165. The cover has a port 166 to which can be connected a compressed air supply conduit. A blowing head 167 is adapted to rotate within the bushing 162. The said blowing head bears normally by means of a ring 168 on a shoulder 169 of the bushing 162 and a helical spring 170 forces the blowing head downwards. The pressure of the spring is transmitted to the bushing 162 by a ball bearing 171. The blowing head has a central aperture 172 for the passage of the air and has arranged on its lower end a hardened steel locking member 173. When the blowing aggregate descends the surface of the said member engages the funnel-shaped inner surface of the pressing mould to which it is ground to fit so that a hermetic seal between the neck mold and the blowing head is also ensured. A hermetic seal between the inner wall of the bushing 162 and the rotatable blowing head vertically moving within it is ensured by a labyrinth packing 175.

When the blowing head is caused to bear on the neck mold it is also rotated by the friction between the locking member 173 and the neck mold. The spring 170 is forced in in the lowermost position of the blowing aggregate.

The air for the final blowing of the portion of glass is derived from the device shewn in detail in Figure 11.

A cylinder 178 is secured to the lower side of the bed-plate 3. The cylinder is provided with a cover 179, it being possible for a piston 180 to be reciprocated by means of a piston rod 181.

In order that the piston 180 may be reciprocated a lever 182 is pivoted on a stud in a bracket 183. The said lever is moved by a lever 184 provided with a roller which runs in a groove 187 of the drum 4 (Figure 2). The lever 184 is united to a rod 185 which with the aid of a hand screw 186 is adjustably connected to an arm 188 of the lever 182.

The air passes from the blowing cylinder 178 through a flexible conduit to the aperture 166 of the blowing aggregate. During the return stroke of the piston the air can flow again through the blowing aggregate to the blowing cylinder as after the final blowing the blowing aggregate has risen again.

As has been previously noted the portion of glass is blown out in the final blowing position in a blowing mould. In this operation the portion of glass is rotated with the neck mold whereas the blowing mould is stationary.

Figure 14:
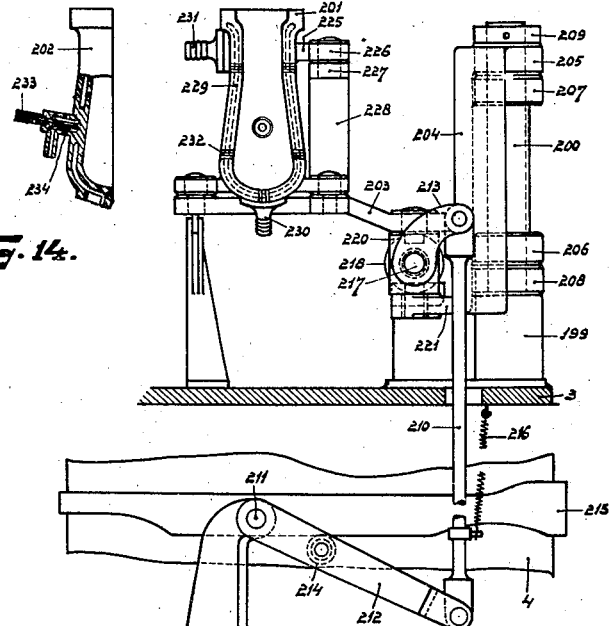
Figure 14 is a view, partially in section and partially in elevation, of one of the blowing mould halves.
Figure 12:
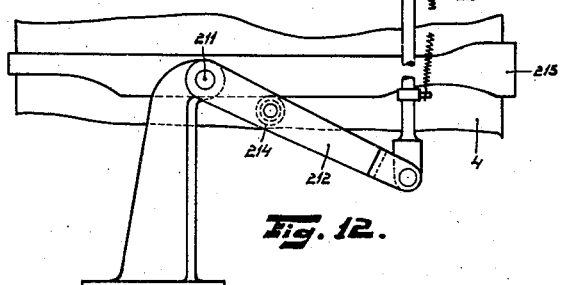
Figure 12 is a view of the finishing mould with its operating mechanism.
Figure 13:
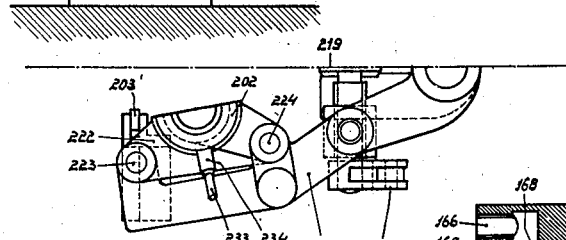
Figure 13 is a plan of the front part of the device shewn in Figure 12.

The construction of the blowing mould with its operating mechanism is shewn in Figures 12 to 14 of the drawings (see also Figure 1).

The bed-plate 3 (Figure 12) has mounted on it a housing 199 with a vertical column 200. The blowing mould consists of two halves 201 and 202 adapted to move relatively to each other and secured to arms 203 which are adapted to rotate on the column 200. The arm 203 of the foremost bulb half is secured to a vertical connecting member 204 which has attached to it rings 205 and 206 adapted to rotate on the column 200. The vertical connecting member of the hindmost bulb-half is secured to rings 207 and 208 similarly adapted to rotate on the column 200. A locking ring 209 prevents the rings from moving in a vertical direction.

A rod 210 serves to open and close the blowing mould halves, said rod having one end connected to a lever 212 pivoted on a stud 211 and the other end to a lever 213. The lever 212 is provided with a roller 214 which rides on a cam track 215 of the drum 4. The roller is kept in engagement with the track by a draw-spring 216.

The crank 213 is rigidly secured to a horizontal shaft 217 which is provided with a left hand and a right hand thread and carries a guide roller 218 adapted to move backwards and forwards between guides 219 on the housing 199. Those portions of the shaft 217 provided with a left hand and a right hand thread have around them thread blocks 220 which are connected by bolts to the arm 203 and to the arms 221 which similarly project from the vertical connecting member 204. When the roller 214 is vertically moved the shaft 217 is turned backwards and forwards so that the blocks 220 are separated and approached and the blowing mould halves are correspondingly opened and closed. The construction described ensures that the blowing mould remains continuously centered relatively to the neck mold.

The mould half 202 is secured to the arm 203 by a base-member 222 secured to the arm 203 by adjusting pins 223 and 224 and by an arm 225 which by a stud 226 is connected to an arm 227 secured to a column 228 mounted on the arm 203. The arms 203 have secured to them small brackets carrying small rollers 203'. The rollers 203' which ride on horizontal guides support each one of the arms 203 when the mould is being closed.

The mould halves consist of metal and it is therefore desirable in order to facilitate the rotation of the portion of glass that the inner surface of the mould should be dressed with moulding grease which should be regularly kept cold and moist to prevent the grease from burning. For this purpose the walls of the mould halves are cooled by a circulating cooling liquid, whilst the inner walls are moistened by the production of a spray of water within the blowing mould.

The wall of the mould half 201 has a cavity 229 through which a cooling liquid, for example, water can flow. Nipples 230 and 231 serve for the connection of the supply and discharge conduit respectively. Fine apertures 232 in the mould wall serve for the escape of air which otherwise would be compressed between the mould wall and the blown-out glass.

In the construction illustrated a spray of water is formed within the blowing mould wall by spraying a very finely divided jet of water. The fine division of the jet is ensured by throwing simultaneously a jet of water from a nozzle 233 (Figure 14) and a jet of compressed air surrounding the former from a nozzle 234.

The device for feeding water and air at the desired moment may be constructed in any known manner and is not illustrated in the drawings as it is not in direct connection with the invention.

After the final blowing aggregate has risen and the blowing mould halves have opened, the bulb is transferred into position C of the machine by reason of the swinging of the table 24. In the said position the bulb is sealed off the lost head by a centrally arranged burner 236 (Figure 15) whereupon the sealed off bulb is withdrawn from the machine.

The burner with its operating mechanism and the ejecting mechanism for the bulb are shewn in detail in Figures 15 to 18 of the drawings.

The vertically movable burner 236 has a number of apertures 237 (Figure 15) uniformly distributed about its circumference said apertures permitting the mixture of gas and air or oxygen respectively fed by supply conduits 238 and 239, to escape.

When the bulb arrives in position C the burner 236 is in its uppermost position. Then the burner descends into the operative position shewn in full lines in Figure 15.

The burner is suspended on a rod 240 adapted to vertically slide in a sleeve 241 secured to the frame 26. The rod 240 can be vertically moved by a lever 242 which is pivoted on a pin 243 and maintains the burner normally in its uppermost position under the influence of a spring 244. The lever 242 can be lowered against the action of said spring by means of a sleeve 158 adapted to slide on the column 159, said sleeve being adapted to be vertically moved by the rod 160 on the column 159 (Figure 1) in the manner previously described. A strap 245 is clamped on the sleeve 158 and carries with its bifurcated end a small sleeve 246 (Figure 18) in which an adjusting screw 247 with a head 248 is adapted to move vertically.

This head has rigidly mounted on it arms 249 and 250. Bell-cranks 251 and 252 pivoted on fixed points are provided with hook-shaped ends adapted to engage projections 253 of the lever 242.

When the sleeve 158 rises and consequently the sleeve 246 and the head 248 rise similarly, the spring 244 draws the lever 242 upwards so that the burner 236 rises also. If the sleeve 158 descends, the hook-shaped ends of the bell-cranks 251 and 252 pull the lever 242 downwards by means of the projections 253 so that the burner 236 descends similarly. If however for some reason, for example owing to glass having accumulated in the funnel-shaped portion of the neck mold, the burner while descending meets with considerable resistance, the springs of the bell-cranks 251 and 252 are extended so that the hook-shaped ends of the projections 253 are suddenly released and the lever 242 is not pulled downwards. This arrangement prevents breakage of or damage to elements of the machine.

During the sealing-off operation the burner 236 directs a sharp flame against the inner wall of the bulb. At this point the bulb is fused and when the bulb is lowered by the arrangement hereinafter described, a severance is effected between the lost head 254 remaining in the neck mold and the bulb 255. The outwardly directed pressure of the gas-flames prevents the upper edge of the bulb from flanging towards the inside and thus rendering the product unserviceable for many purposes.

In position C there are in addition devices for supporting, centering and ejecting the bulb.

The vertical shaft 18 (Figure 15) is provided with a gear wheel 258 which by the intermediary of a gear wheel 259 drives a pinion 260. This pinion causes a shaft 262 vertically movable in a housing 261 to rotate.

A seat 263 on which the bottom of the bulb is caused to bear is provided with a stud loosely inserted in the shaft 262. When the shaft rotates the seat 263 is carried along with it by friction only. The transmissions between the shaft 18 and the neck molds and between the said shaft and the shaft 262 are such that the neck mold and the seat 263 rotate at practically the same speed of revolution.

A frame 264 is pivoted on the upper end of the shaft 262. This frame has connected to it a downwardly directed rod 265 which is vertically guided in the housing 261. The rod 265 is provided with projections 266 and 267 which engage the end of a lever 268 (Figures 16 and 17) secured to a shaft 270 adapted to rotate in a housing 269. A lever 271 the end of which is vertically moved by a rod 272 (Figure 17) is secured to the other end of the shaft 270 so that when the rod 272 is vertically moved the rod 265 with the members united thereto is likewise vertically moved. The rod 272 is connected to a lever (not shown) pivoted on a fixed point and provided with a roller running in a groove 273 of the drum 4.

The arrangement is such that the rod 265 descends when the glass is sufficiently fused at the desired point of severance. The downward movement of the seat 263 permits the bulb 255 which is constantly rotated to fall downwards which ensures the severance from the lost head 254. The vertical movement of the rod 265 is transmitted to the shaft 262 and the seat 263 by a roller 274 of the frame 264, which roller is provided with an annular groove 275.

A little before the ejection of the bulb the seat 263 is caused to bear on studs 276 and 277 (Figure 16) rigidly connected to the housing 261 which ensures that the rotary motion of the seat ceases and consequently the bulb no longer rotates when ejected.

An ejector 278 bifurcated at the end is rotatably mounted on a stud 279 secured in the frame 264. The ejector 278 connects by a spring 280 to a bell crank 281 which is likewise pivoted on the stud 279 and is provided at one end with two projections 282 and 283.

When the frame 264 descends the projection 282 engages a roller 284 rigidly connected to the housing 261. Thus the bell crank 281 and after the spring 280 is stretched, similarly the ejector 278 is turned and the bulb is removed laterally from its support against the action of the spring 285 and 286 (Figure 16) which force rollers mounted on the bell cranks 287 and 288 against the bulb wall. When the frame 264 rises again the projection 283 engages the roller 284 and the ejector 278 is again brought back into its off-position. During the sealing-off operation and afterwards the bulb is centered by the rollers at the ends of the bell-cranks 287 and 288 and by a roller 289 which is mounted at the end of a stud rigidly secured to the frame 264.

After the bulb is sealed off and removed the burner 236 rises again and the neck mold with the lost head suspended by it is transferred into the position D of the machine in which position the lost head is removed from the neck mold. A vertically movable expulsion stud 292 (Figure 1) serves to expel the lost head. The said stud is guided in the frame 26 and is secured by a bracket 293 to a sleeve 294 adapted to vertically move on the column 295. This column is mounted on the bed-plate 3 and is held at the upper end by the frame 26. The sleeve 294 is vertically moved by a rod 296 connected to a lever (not shewn) pivoted on a fixed point and provided with a roller which runs in a groove 297 of the drum 4 (Figure 2).

When the expulsion stud 292 descends it presses on the upper edge of the lost head 254 (Figure 15) and by reason of the deviation of the bulb holders 77 and 78 (Figure 5) it is possible for the lost head to fall down. The lost head is then withdrawn from the machine by any suitable device.

The groove 297 is preferably so formed that the expulsion stud rises and descends twice for each neck mold so that glass particles which might have remained suspended in the neck mold after the first ejecting movement are removed with certainty.

After the expulsion stud has risen the neck mold moves again to the position A of the machine, whereupon the described series of operation is carried out again upon a fresh portion of glass.

What I claim is:

1. A machine for manufacturing hollow glass bodies comprising a neckmold movable intermittently along a predetermined path, a pressing plunger and a pressing mold cooperating therewith to form a pressed glass body with a lost head and arranged at one point of said path to cooperate with said neckmold, a blowing head with a final blowing mold cooperating therewith and arranged at another point of said path to cooperate with said neckmold to form a blown body, a device for severing the blown body from the lost head, a device for removing the lost head from the neckmold and actuating means for successively moving said neckmold into registry with said pressing mold, actuating said pressing plunger and pressing mold, moving said neckmold into registry with said final blowing mold, forming the blown body in said final blowing mold, moving said neckmold into registry with said severing device, operating said severing device, moving said neckmold into registry with said removing device and actuating said last-mentioned device.

2. A machine for manufacturing hollow glass bodies comprising a series of neckmolds mounted upon a movable frame, a pressing plunger and a pressing mold cooperating therewith to form a pressed glass body with a lost head, a blowing head with a final blowing mold cooperating therewith to form a blown body, a device for severing the blown body from the lost head, a device for removing the lost head from the neckmolds and actuating means for moving said frame to bring the neckmolds successively into cooperative relation with said pressing mold, actuating said pressing plunger and pressing mold, moving said neckmolds into registry with said final blowing mold, forming the blown body in said final blowing mold, moving said neckmolds into registry with said severing device, operating said severing device, moving said neckmolds into registry with said removing device and actuating said last-mentioned device.

3. A machine for manufacturing hollow glass bodies comprising a series of neckmolds movable bodily in a common plane and each rotatable upon its own axis, a pressing plunger and a pressing mold cooperating therewith to form a pressed glass body with a lost head, said plunger and mold being supported adjacent said plane and arranged to cooperate with each of said neckmolds successively, a blowing head with a final blowing mold cooperating therewith to form a blown body, said blowing head and blowing mold being supported adjacent said plane and arranged to cooperate with each of said neckmolds successively, means for severing the blown body from the lost head supported adjacent said plane and arranged to cooperate with each of said neckmolds successively, means for removing the lost head from the neckmolds after the blown body has been severed and actuating means for rotating said neckmolds, for moving said neckmolds into cooperative relation to said pressing, blowing, severing and removing means successively and for actuating said pressing, blowing, severing and removing means.

4. A machine for manufacturing hollow glass bodies comprising a series of neckmolds movable bodily in a common plane and each rotatable upon its own axis, a pressing plunger and a pressing mold cooperating therewith to form a pressed glass body with a lost head, said plunger and mold being supported adjacent said plane and arranged to cooperate with each of said neckmolds successively, a blowing head with a final blowing mold cooperating therewith to form a blown body, said blowing head and blowing mold being supported adjacent said plane and arranged to cooperate with each of said neckmolds successively, means for severing the blown body from the lost head supported adjacent said plane and arranged to cooperate with each of said neckmolds successively, means for removing the lost head from the neckmolds after the blown body has been severed, actuating means for rotating said neckmolds, for moving said neckmolds into cooperative relation to said pressing, blowing, severing and removing means successively and for actuating said pressing, blowing, severing and removing means and means for interrupting the rotation of the neckmolds at predetermined points in the cycle of operation of the machine.

5. A machine for manufacturing hollow glass bodies comprising a pressing plunger and a pressing mold cooperating therewith, a blowing head with a final blowing mold cooperating therewith, a number of neck molds movable to bring the glass bodies to be operated upon simultaneously into operative relation to the said pressing plunger and mold and blowing head and mold, said neck molds being rotatable on their own axes, means for moving and rotating said neck molds, means for locking the normally rotating neck molds, means for operating the pressing plunger and blowing head when the neck molds are in operative relation thereto and means for removing the finished glass body from the machine.

6. A machine for manufacturing hollow glass bodies comprising a pressing plunger and a pressing mold cooperating therewith, a blowing head and a final blowing mold cooperating therewith, a number of neck molds movable to bring the glass bodies to be operated upon simultaneously into operative relation to the said pressing plunger and mold and blowing head and mold, said neck molds being rotatable on their own axes, driving gears connected to said neck molds and driven by friction from an uninterruptedly rotating member, pawls movable into or out of engagement with the teeth of the said gears, means for operating said pawls to control the rotation of the neck molds as desired, means for moving the neck molds and the pressing plunger and blowing head relatively to each other and means for removing the finished glass bodies from the machine.

7. A machine for manufacturing hollow glass bodies comprising a pressing plunger and a pressing mold cooperating therewith, a blowing head with a final blowing mold cooperating therewith, a number of neck molds movable to bring the glass bodies to be operated upon simultaneously into operative relation to the pressing plunger and mold and blowing head and mold, means for moving said neck molds, said blowing head being provided with a sealing member, which in the final blowing position bears hermetically on the innerwall of each neck mold and being further provided with a passageway for the passage of the compressed air, and means for so supporting said sealing member in relation to the blowing head that it is capable of automatically adjusting itself into proper relation to the neck molds.

8. A machine for manufacturing hollow glass bodies comprising a pressing plunger and a pressing mold cooperating therewith to form a pressed glass body with a lost head, a blowing head with a final blowing mold cooperating therewith to form a blown body, a device for severing the blown body from the lost head, a device to remove the lost head, a number of neck molds movable to bring the glass body to be operated simultaneously into operative relation to the said pressing plunger and mold and blowing head and mold and said devices, means for moving the neck molds, the pressing plunger, the blowing head and the device for severing the glass bodies relatively to each other, means for removing the finished glass body from the machine, each neck mold consisting of a funnel-shaped portion for guiding the charge of glass, a stationary portion and two rotatable jaws secured thereto, the edges of which form together with the lower edge of the stationary portion an interstice in which the glass body to be operated upon can be suspended and resilient means for closing said jaws.

9. A machine for manufacturing hollow glass bodies comprising a pressing plunger and a pressing mold cooperating therewith, a blowing head with a final blowing mold cooperating therewith, a number of neck molds movable to bring the glass bodies to be operated simultaneously into operative relation to the said pressing plunger and mold and blowing head and mold, said neck molds being rotatable on their own axes, means for moving and rotating said neck molds, each of said neck molds comprising a stationary portion and two rotatable jaws secured therewith, the edges of which form together with the lower edge of the stationary portion an interstice in which the glass body to be operated upon is suspended and resilient means for closing said jaws, means for locking said neck molds against movement during a preliminary blowing operation and means for releasing said locking means.

10. A machine for manufacturing hollow glass bodies comprising a pressing plunger and a pressing mold cooperating therewith, a blowing head with a final blowing mold cooperating therewith, a number of neck molds movable to bring the glass bodies to be operated simultaneously into operative relation to the said pressing plunger and blowing head and means for moving said neck molds, each of the neck molds being provided with a funnel-shaped portion, driving gears connected to said neck molds and driven by friction from a rotating member, pawls movable into or out of engagement with the teeth of said gears and means for operating said pawls.

11. In a machine of claim 5, means for releasing the neck molds from the hold of the locking means during a preliminary blowing operation and then locking said neck molds again so that the neck molds do not rotate during the transfer from the pressing position to the final blowing position and means for effecting the release of the neck molds while at the final blowing position.

12. In a machine according to claim 5, a vertically movable press-and-blow aggregate provided near the pressing position of the neck molds and comprising a rotary portion serving for the hermetic seal along the upper edge of the glass and said pressing plunger which is itself not rotatable, said rotary portion of the aggregate mounted for vertical sliding movement along the pressing plunger and resilient means for positioning said portion in relation to the plunger.

13. The machine of claim 5, in which the blowing head comprises a sealing member which in the final blowing position bears hermetically on the inner wall of the neck molds and is provided with a passage for the compressed air.

14. The machine of claim 5, in which the blowing head comprises a sealing member which in the final blowing position bears hermetically on the inner wall of the neck molds, a stationary bushing, said sealing member having a cylindrical projecting portion mounted in said bushing for rotation and vertical sliding movement, and means to ensure a hermetic seal between the said sealing member and bushing.

15. A machine for manufacturing hollow glass bodies comprising a pressing plunger and a pressing mold cooperating therewith to form a pressed glass body with a lost head, a blowing head with a final blowing mold cooperating therewith to form a blown body, a device for severing the blown body from the lost head, a device to remove the lost head, a number of neck molds movable to bring the glass body to be operated upon simultaneously into operative relation to the said plunger and blowing head and said devices, means for moving the neck molds, the pressing plunger, the blowing head and the device for severing the glass bodies relatively to each other, means for removing the finished glass body from the machine, each of said neck molds consisting of a funnel-shaped portion for guiding the charge of glass, a stationary portion and two rotatable jaws secured thereto, the edges of which form together with the lower edge of the stationary portion an interstice in which the glass body to be operated upon can be suspended and resilient means for closing said jaws.

In testimony whereof I affix my signature, at the city of Eindhoven, this 30th day of March, 1925.

PANCRAS SCHOONENBERG.